United States Patent
Weast et al.

(10) Patent No.: US 6,880,644 B2
(45) Date of Patent: Apr. 19, 2005

(54) DEEP TILLAGE RIPPER WITH INDEPENDENT, SPRING-MOUNTED CLOSING WHEELS

(75) Inventors: David H. Weast, Buhler, KS (US); Rodney L. Hagman, Buhler, KS (US)

(73) Assignee: Krause Plow Corporation, Inc., Hutchinson, KS (US)

( * ) Notice: Subject to any disclaimer, the term of this patent is extended or adjusted under 35 U.S.C. 154(b) by 55 days.

(21) Appl. No.: 10/440,275

(22) Filed: May 16, 2003

(65) Prior Publication Data

US 2004/0226727 A1 Nov. 18, 2004

(51) Int. Cl.[7] .......................... A01B 39/22; A01B 61/04
(52) U.S. Cl. ........................ 172/196; 172/140; 172/570
(58) Field of Search .................................. 172/196, 140, 172/174, 462, 518, 571–573, 570; 111/52, 149, 120, 155

(56) References Cited

U.S. PATENT DOCUMENTS

| | | | | |
|---|---|---|---|---|
| 3,627,063 A | * | 12/1971 | Ryan ........................... | 172/627 |
| 4,214,537 A | * | 7/1980 | Bailey et al. ................ | 111/149 |
| 4,421,331 A | * | 12/1983 | Ferris ......................... | 280/81.1 |
| 4,539,921 A | * | 9/1985 | Morlock ...................... | 111/52 |
| 4,579,071 A | * | 4/1986 | Johnson ...................... | 111/195 |
| 4,691,645 A | * | 9/1987 | Anderson .................... | 111/155 |
| 5,361,848 A | * | 11/1994 | Fleischer et al. ........... | 172/140 |
| 5,461,994 A | * | 10/1995 | Zimmerman ................ | 111/121 |
| 6,012,534 A | | 1/2000 | Kovach et al. ............. | 172/196 |
| 6,325,156 B1 | * | 12/2001 | Barry ......................... | 172/518 |
| 6,502,644 B1 | | 1/2003 | Steinlage et al. .......... | 172/196 |
| 2002/0144830 A1 | * | 10/2002 | Steinlage et al. .......... | 172/538 |

* cited by examiner

*Primary Examiner*—Robert E. Pezzuto
*Assistant Examiner*—Alexandra K. Pechhold
(74) *Attorney, Agent, or Firm*—Hovey Williams LLP

(57) ABSTRACT

A tillage tool includes a relatively narrow shank that slices through the soil while a ripper point at its lower end fractures and lifts the subsoil. Minimum surface disturbance adjacent the opposite sides of the shank is assured through the provision of a pair of independently mounted down-pressure wheels on opposite sides of the shank that engage and apply constant downward pressure against soil tending to erupt at the top surface. Each down pressure wheel is mounted to the shank assembly by its own leaf spring so that the two wheels react to ground changes independently of one another and without adversely affecting each other. A guide plate associated with each leaf spring prevents twisting of the spring as it flexes and provides stops for limiting the opposite extremes of up and down flexing of the spring.

13 Claims, 5 Drawing Sheets

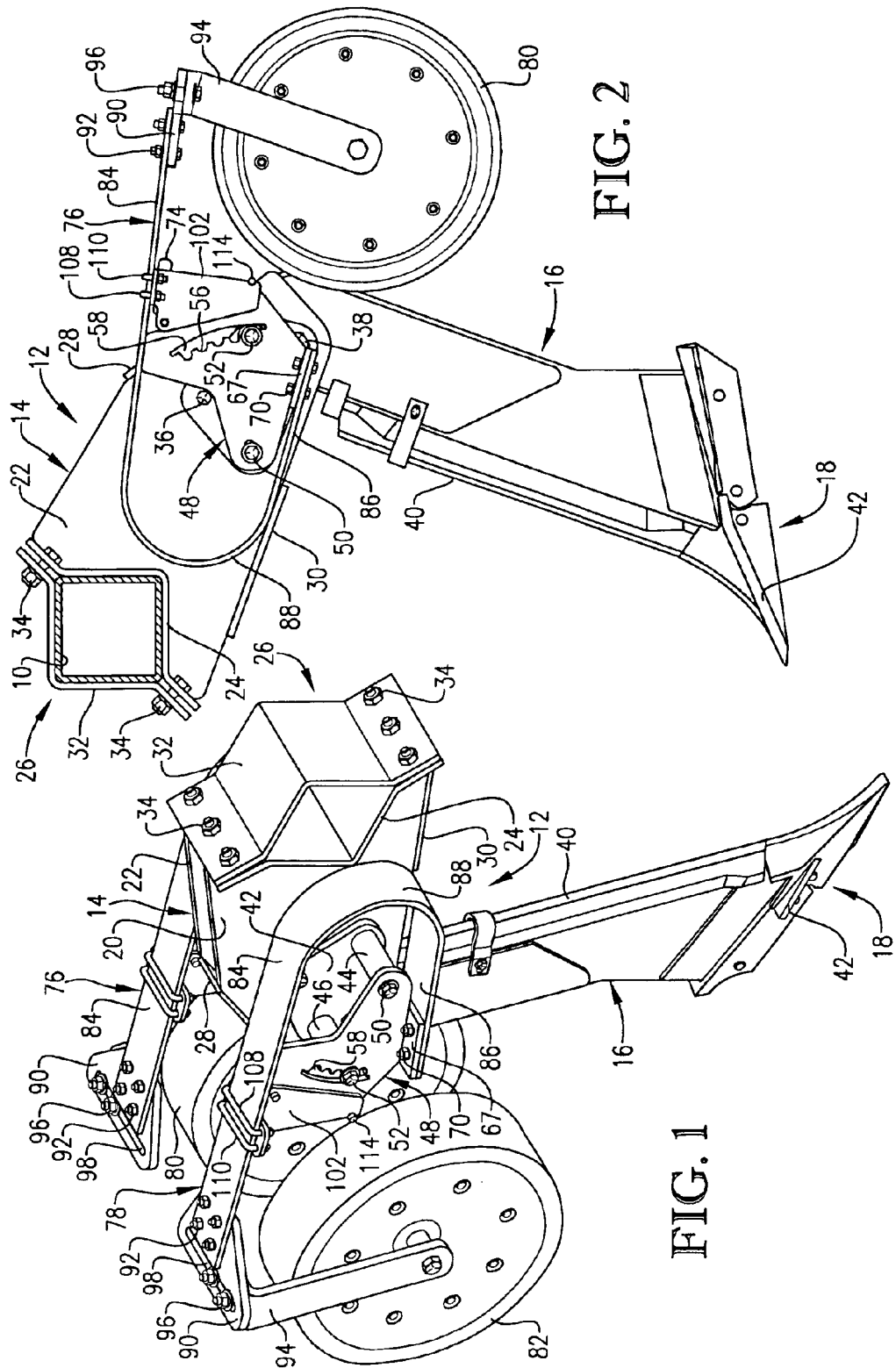

DEEP TILLAGE RIPPER WITH INDEPENDENT, SPRING-MOUNTED CLOSING WHEELS

TECHNICAL FIELD

This invention relates to the field of tillage equipment and, more particularly, to a deep ripper tillage tool that minimizes surface disturbance through the use of independent, spring-mounted down pressure wheels on opposite sides of each shank assembly of the tool.

BACKGROUND AND SUMMARY

In many deep ripping situations, it is desirable to leave the ground surface as undisturbed as possible to avoid the need for extensive surface preparation prior to other subsequent operations, such as seed planting. Many deep ripper points have a tendency, however, to cause surface eruptions on opposite sides of the tillage shank due to the lifting and fracturing action of wings and other inclined surfaces on the ripper point. Thus, it is known in the art to provide downwardly spring-biased ground wheels on opposite sides of the shank assembly to resist soil eruption at those locations and to press down and firm the ridges or berms created on opposite sides of the shank assembly. See for example U.S. Pat. Nos. 6,502,644 and 6,012,534.

However, in both of those prior patents, the two wheels associated with each shank assembly are pivotally mounted to the shank assembly on a common carrier that causes both wheels to rise and fall together as terrain changes are encountered by either one of the wheels. Because surface variations are often different on opposite sides of the shank assembly, rises encountered by one wheel will cause both wheels to lift even though the other wheel may not be experiencing the same condition. Consequently, the unnecessarily lifted wheel may fail to perform its downward pressing function in the most desired manner.

The present invention overcomes deficiencies in the prior art by providing a pair of firming wheels for each shank assembly that are separately and independently mounted to the shank assembly so that each wheel rises and falls independently of the other. Each wheel therefore reacts to soil conditions on its own side of the shank assembly without being affected by conditions encountered by the other wheel, to the end that a better overall firming action is obtained for the field.

Furthermore, in the present invention the down pressure wheels are mounted to the shank assembly in a simplified manner, i.e., by a spring for each wheel that serves the dual roles of a mounting means for the wheel and a source of down pressure or bias for the wheel. Preferably, the spring comprises a leaf spring. Instead of pivoting about a relatively short radius during up and down movement, each wheel simply moves up and down in a straight line path of travel as the leaf spring flexes during build up and release of its stored energy.

In one preferred embodiment, each leaf spring is generally J-shaped and is disposed in a horizontal attitude with its long leg extending fore-and-aft and the wheel attached to the rear end of the leg. The short leg of the spring is spaced below the long leg and is integrally attached thereto adjacent the front of the leaf spring by an arcuate bight portion of the spring. The short leg is attached to the shank assembly in a secure fashion so that primarily only the upper leg flexes as the wheel applies down pressure during field operations. The bight of the leaf spring is looped around an upright guide plate having an upper edge that forms a seat for the upper leg of the leaf spring and limits its downward flexing movement. Anti-twist structure comprising a pair of depending members on the leaf spring embrace the upright guide plate to prevent twisting of the upper leaf spring leg during the flexing action, while other interacting structure between the rear edge of the guide plate and the depending members keep the upper leaf spring leg moving in a rectilinear path of travel during its flexing motion. The short leaf spring leg is attached to the bottom edge of the guide plate, and provision is made to adjust the home position of each wheel by angularly adjusting the vertical position of the guide plate.

BRIEF DESCRIPTION OF THE DRAWINGS

FIG. 1 is a right front isometric view of a tillage tool constructed in accordance with the principles of the present invention, such tool incorporating independent, spring-mounted down pressure wheels in accordance with the present invention;

FIG. 2 is a left side elevational view thereof illustrating in cross section a tubular tool bar to which the shank assembly of the tool is mounted;

DETAILED DESCRIPTION

Figure 3:
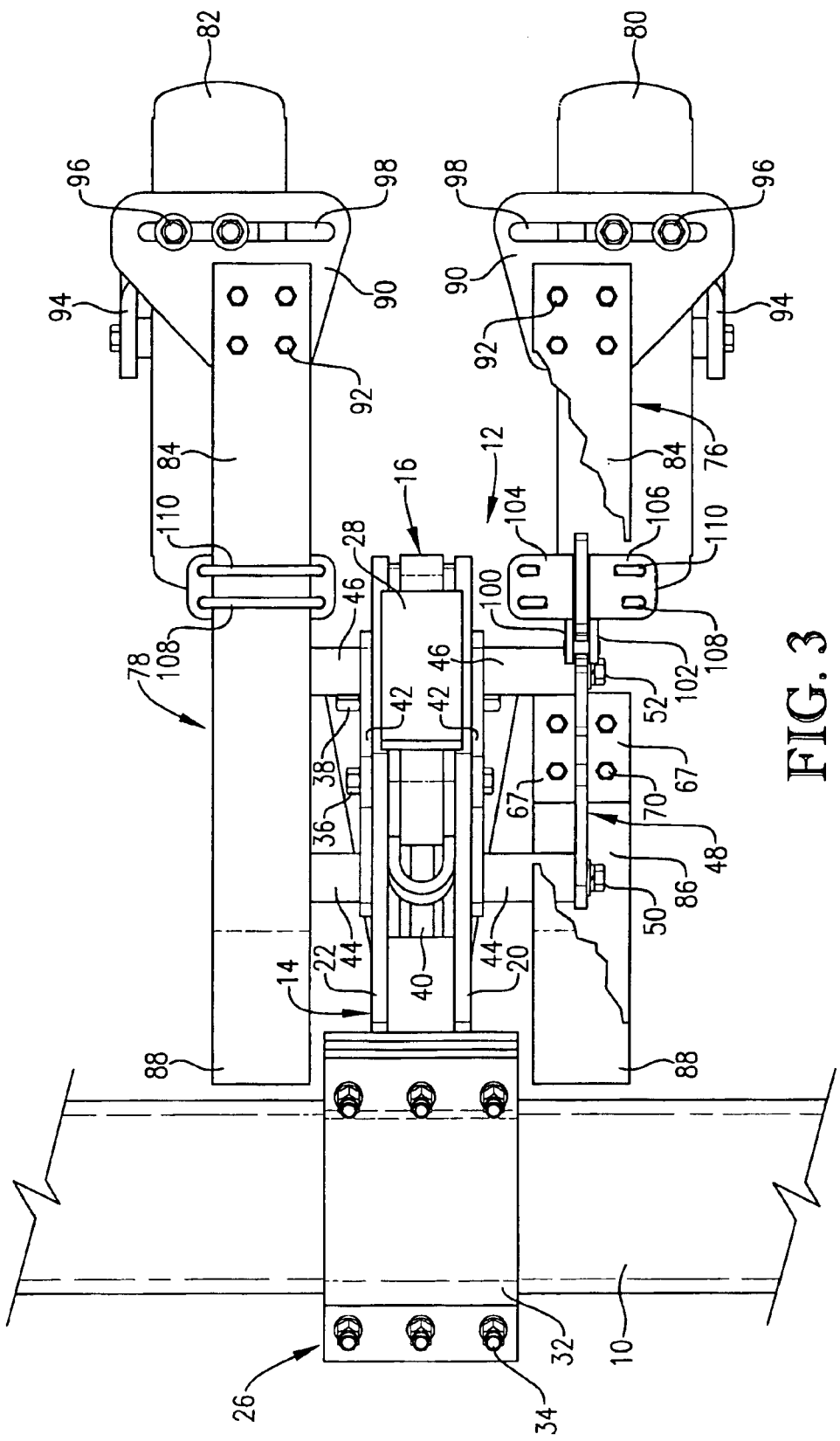
FIG. 3 is a fragmentary, top plan view of the tool with parts broken away to reveal details of construction.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The drawings illustrate a single row unit of a tillage tool in accordance with the present invention. It will be appreciated, however, that, typically, a plurality of such row units are mounted on a common tool bar that may be three-point mounted to a tractor (not shown). Thus, in FIG. 2, a tubular tool bar 10 is illustrated, and a shank assembly broadly denoted by the numeral 12 is shown attached to tool bar 10. Each shank assembly 12 includes as its primary parts a mounting bracket 14, a slender, generally upright shank 16, and a ripper point 18 attached to the bottom end of shank 16.

Mounting bracket 14 includes a pair of downwardly and rearwardly extending plates 20 and 22 that are spaced apart laterally and are maintained in such condition by one-half 24 of a clamp 26 for securing bracket 14 to tool bar 10. Plates 20, 22 are also maintained in their spaced apart condition by a top plate 28 and a bottom plate 30 spanning the distance between the two upright plates 20, 22. The other half 32 of clamp 26 matingly engages the opposite side of tool bar 10, and clamp halves 24, 32 are secured together by bolts 34.

Shank 16 is a slender, plate-like shank that is substantially wider in a fore-and-aft direction than in a transverse direction. The upper end of shank is received between plates 20, 22 of bracket 12 and is securely held in such position by a pair of bolts 36 and 38. Shank 16 extends generally downwardly and slightly forwardly from the lower rear end of bracket 14 and may include an inclined, sharpened shin 40 along its leading edge to serve as a hardened cutting surface for opening a slit in the ground during advancement of the tool. The ripper point 18 at the bottom of shank 16 may take a variety of different forms as well understood by those skilled in this art and generally includes a plurality of upwardly and rearwardly inclined lifting and fracturing surfaces such as those appearing on wings 42 of ripper point 18.

Each of the mounting bracket plates 20, 22 has a smaller adaptor plate 42 attached to the exterior surface thereof by the bolts 36 and 38 used to secure shank 16 to bracket 14. Adaptor plate 42 has a pair of cylindrical spacers 44 and 46 that are welded thereto and project laterally outwardly therefrom for supporting a generally upright, irregularly shaped guide plate 48. Spacers 44 and 46 are internally threaded so as to threadably receive a pair of corresponding screws 50 and 52 that secure guide plate 48 to spacers 44, 46.

Figure 5:
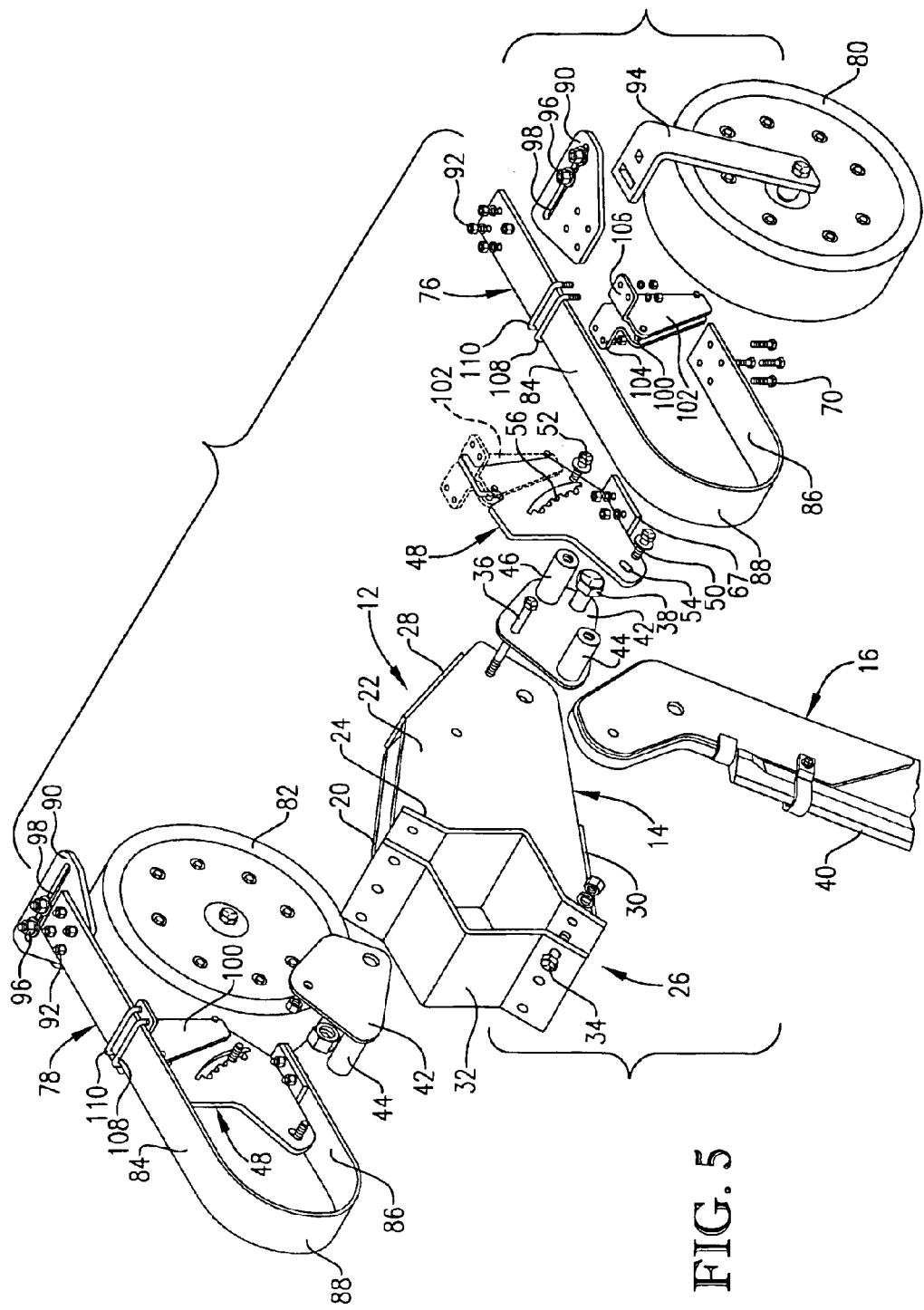
FIG. 5 is an exploded isometric view of the tool.

Screw 50 is received within an elongated hole 54 in the nose of guide plate 48 (FIGS. 5, 6 and 7), while screw 52 is received within any selected one of a series of notches 56 disposed on an arc having its center at the elongated hole 54. Notches 56 open rearwardly to a correspondingly arcuate slot 58 that extends in opposite directions slightly beyond the endmost notches 56 in the series. Thus, when screws 50 and 52 are loosened, guide plate 48 may be pushed forwardly to the extent permitted by the back end of elongated hole 54 and arcuate slot 58, whereupon guide plate 48 may be pivoted about screw 50 to adjust the angular position of guide plate 48 relative to shank assembly 12. When rear screw 52 is aligned with the selected notch 56, guide plate 48 may be shifted rearwardly to engage screw 52 within such notch, whereupon screws 50 and 52 are retightened to maintain guide plate 48 in its selected position of angular adjustment.

Figure 6:
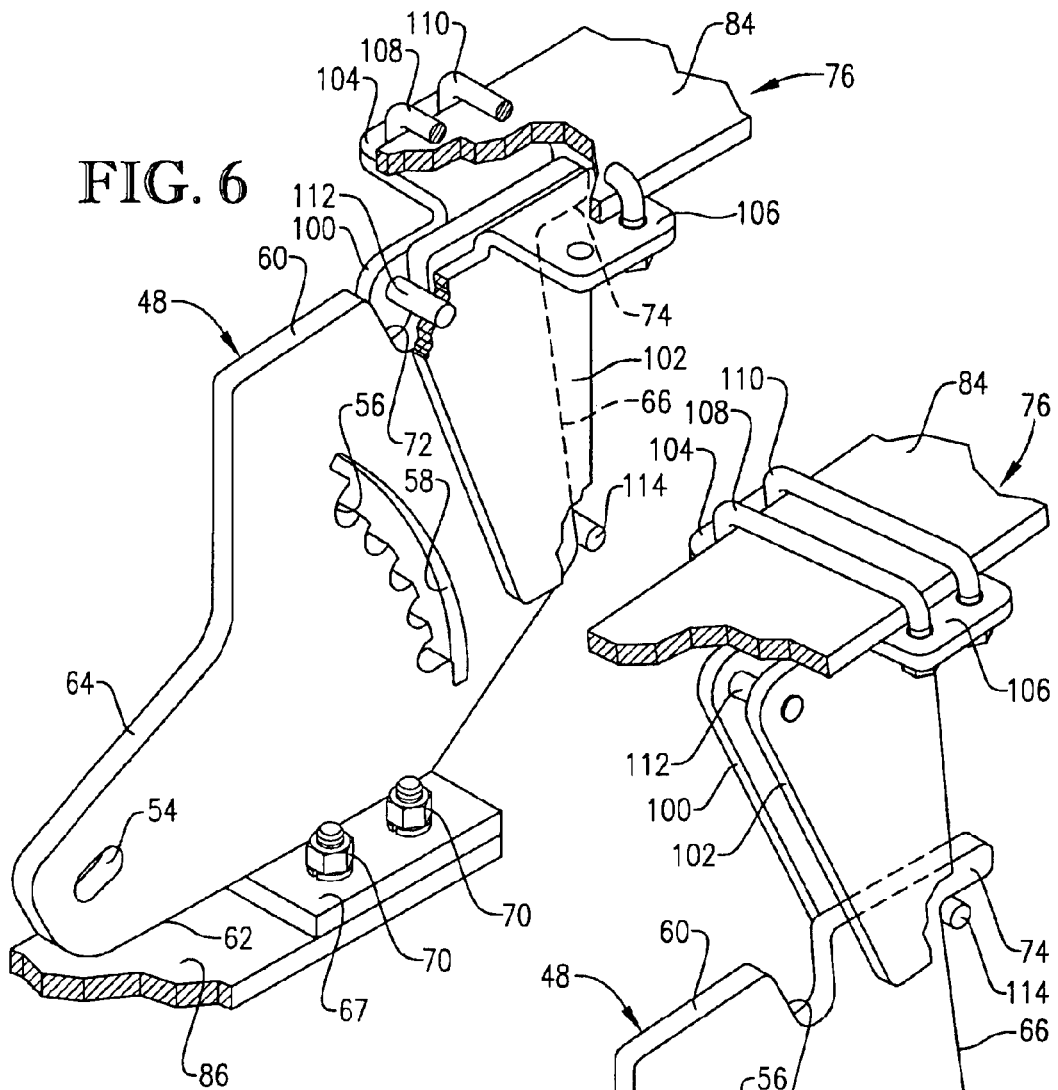
FIG. 6 is an enlarged, fragmentary isometric view of the tool illustrating in particular the guide plate thereof with the leaf spring seated on the top edge of the guide plate in its at rest or home position.
Figure 7:
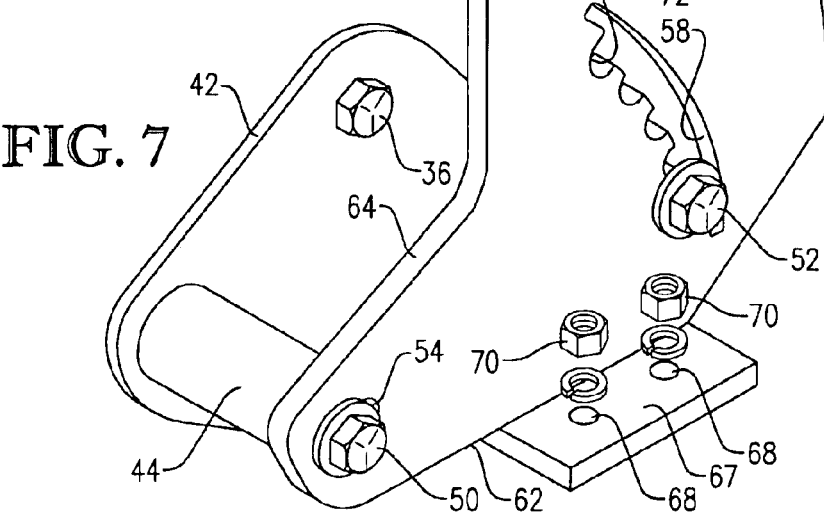
FIG. 7 is an enlarged isometric view of the guide plate and associated structures similar to FIG. 6 but showing the leaf spring flexed up to its upper limit of travel.

As perhaps seen most clearly in FIGS. 6 and 7, each guide plate 48 includes a top edge 60, a bottom edge 62, a notched front edge 64, and a generally upright rear edge 66. Bottom edge 62 has a transverse mounting plate 67 affixed thereto and extending laterally outwardly therefrom in opposite directions. Opposite ends of mounting plate 67 are provided with bolt holes 68 (FIG. 7) for receiving leaf spring mounting bolts 70. Top edge 60 is provided with a generally centrally disposed notch 72, and rear edge 66 has a shoulder 74 that projects rearwardly therefrom at the intersection of rear edge 66 with top edge 60.

The two guide plates 48 carry respective springs 76 and 78 that serve as the means by which a pair of corresponding down pressure or firming wheels 80 and 82 are mounted to the shank assembly 12. Preferably, springs 76 and 78 comprise leaf springs, but other types of springs may also be satisfactory such as, for example, torsion springs. The two leaf springs 76 and 78 are generally J-shaped and horizontally disposed with their long leg 84 spaced above the lower, short leg 86 thereof. An arcuate bight 88 is located at the front ends of legs 84 and 86 and integrally interconnects such legs. The free end of short leg 86 is secured to mounting plate 67 using the bolts 70, while the free end of the upper long leg 84 has a generally trapezoidal shaped mounting plate 90 secured thereto by a plurality of bolts 92. Each mounting plate 90, in turn, has an inverted, generally L-shaped wheel arm 94 secured thereto by a plurality of bolts 96. Each wheel arm 94 rotatably supports a corresponding wheel 80 or 82 at its lower end. Mounting bolts 96 are received within a transverse adjustment slot 98 in mounting plate 90 so that the lateral positions of wheels 80 and 82 may be somewhat adjusted relative to leaf springs 76, 78 and shank assembly 12.

The upper leg 84 of each leaf spring 76, 78 is seated on top edge 60 of the corresponding guide plate 48, unless the leaf spring has been flexed upwardly because its wheel 80 or 82 has been lifted by rises in the terrain. Thus, top edge 60 serves as a stop for limiting downward movement of top leg 84 of leaf spring 76 or 78. Each top leg 84 is also provided with a follower for guide plate 48 in the form of a pair of laterally spaced, depending plate members 100 and 102 that are disposed on opposite inboard and outboard sides of the corresponding guide plate. Plate members 100, 102 have outturned flanges 104 and 106 respectively at their upper ends that receive a pair of U-bolts 108 and 110 securing members 100, 102 to upper leg 84.

As illustrated in FIG. 6, each pair of plate members 100, 102 has a cross pin 112 adjacent the upper forward corners thereof that spans the plates and is received within notch 72 when top leg 84 is seated down against top edge 60 of guide plate 48 in its at rest position. In addition, the plate members 100, 102 have a cross bar 114 across their lower, rear extremities that is affixed to the plates and abuts shoulder 74 when leaf spring leg 84 is flexed upwardly to a certain predetermined extent as illustrated in FIG. 7. Thus, shoulder 74 serves as a stop to limit the extent of upward travel of leaf spring leg 84. Bar 114 moves along straight rear edge 66 during up and down flexing of leaf spring leg 84 so as to limit up and down movement of wheels 80, 82 to a generally straight line path of travel.

Operation

It should be apparent from the foregoing that as the tool moves across a field with its shanks 16 cutting through the soil, ripper points 18 fracture and lift the subsoil. Although the points 18 are designed to minimize disturbance on the surface of the ground, a certain amount of upheaval or eruption tends to occur on opposite sides of each shank 16. However, by adjusting each guide plate 48 to the appropriate angular position depending upon the running depth of the points 18, wheels 80 and 82 for each shank 16 ride on top of such upheavals and press them downwardly as they attempt to form, thereby preventing them from becoming excessive. As leaf springs 76 and 78 are flexed upwardly, they store energy that produces a downwardly directed restoring force pressing wheels 80 and 82 against the ground. The amount of down pressure exerted by wheels 80, 82 is adjusted by adjusting the angular position of the guide plates 48, taking into account the planned running depth of the shanks 16.

Figure 4:
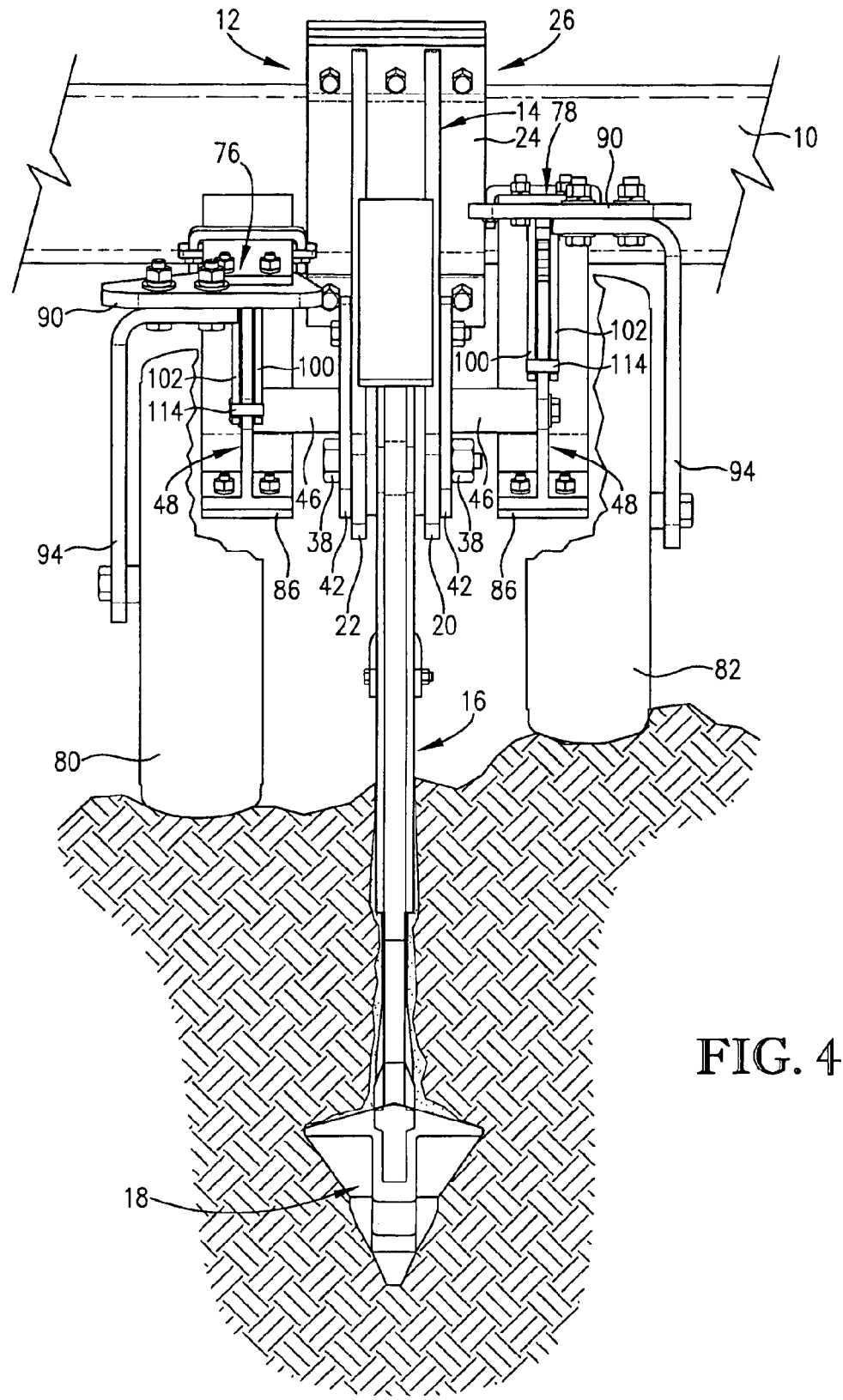
FIG. 4 is a fragmentary rear elevational view illustrating the independent action of the two down pressure wheels of each shank assembly during operation, parts being broken away to reveal details.

It will be noted as illustrated in FIG. 4 that the leaf springs 76, 78 of each pair can flex up and down independently of one another. Thus, each leaf spring 76, 78 reacts to its own particular ground surface conditions experienced by its pressure wheel 80 or 82 as the case may be. Consequently, both pressure wheels 80, 82 are assured of being constantly engaged with the ground surface and exerting an appropriate amount of down pressure. If both wheels 80, 82 were mounted on the same common carrier, as found in prior art devices, a ground rise on one side of the shank experienced by one of the wheels could result in lifting the other wheel out of its proper pressing relationship. Thus, in the present invention, each pressure wheel 80, 82 reacts only to the conditions which it alone confronts and experiences, to the end that the field is left in better condition for subsequent operations such as seed planting.

It will be noted also that depending plate members 100, 102 of each leaf spring cooperate with the corresponding upright guide plate 48 to retain the spring against twisting during up and down flexing thereof. They also keep top leg 84 of each leaf spring properly aligned with the upper edge 60 of the guide plate 48 so as to keep top leg 84 in proper position for reseating against edge 60 when shanks 16 are lifted out of the soil. Each cross bar 114 also keeps the top leaf spring leg 84 from flexing upwardly too far so that the lower ends of plate members 100, 102 are never allowed to lift completely off guide plate 48. And, cross bar 114 also guides top leaf spring leg 84 in a generally straight line, up and down path of travel as it flexes. However, if the uneven terrain or a ground-lying obstacle should happen to exert a sudden rearward force on one or both of the wheels, the cross bar of the affected wheel can be pulled back away from guide edge 66 to the extent necessary to accommodate such occurrence.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A tillage tool comprising:

a transverse tool bar adapted to be positioned at a predetermined height above the ground as the tool is advanced along a path of travel;

a shank assembly attached to said tool bar and including a generally upright shank having a tillage point at its lower end for lifting and fracturing the subsoil as the shank is advanced;

a pair of ground-engaging wheels located on opposite lateral sides of the shank above and behind the point; and a pair of springs on opposite lateral sides of the shank independently mounting the corresponding ground wheels to the shank assembly for individual up and down movement of the wheels under the resistance of the respective springs as the wheels ride along and firm up soil tending to erupt on opposite sides of the shank, each of said springs comprising a leaf spring, each of said leaf springs being provided with anti-twist structure operable to prevent the leaf spring from twisting as it flexes during up and down movement, said anti-twist structure for each leaf spring including an upright, stationary guide secured to the shank assembly and a follower secured to said leaf spring for movement therewith in engagement with said guide.

2. A tillage tool as claimed in claim 1, each of said springs being provided with a stop disposed in the path of flexing movement of the spring for limiting downward travel thereof.

3. A tillage tool as claimed in claim 1, said guide comprising an upright plate, said follower comprising a pair of members depending from the leaf spring and positioned on opposite lateral sides of said plate.

4. A tillage tool as claimed in claim 3, said plate having a straight, generally upright guide edge, said depending members having a transverse bar movable with the members along said straight guide edge of the plate during flexing of the leaf spring.

5. A tillage tool as claimed in claim 4, said plate having a shoulder at an upper end thereof in the path of upward movement of said bar for limiting upward movement of the leaf spring.

6. A tillage tool comprising:

a transverse tool bar adapted to be positioned at a predetermined height above the ground as the tool is advanced along a path of travel;

a shank assembly attached to said tool bar and including a generally upright shank having a tillage point at its lower end for lifting and fracturing the subsoil as the shank is advanced;

a pair of ground-engaging wheels located on opposite lateral sides of the shank above and behind the point; and a pair of springs on opposite lateral sides of the shank independently mounting the corresponding ground wheels to the shank assembly for individual up and down movement of the wheels under the resistance of the respective springs as the wheels ride along and firm up soil tending to erupt on opposite sides of the shank, each of said springs comprising a leaf spring, each of said leaf springs being generally J-shaped and horizontally disposed, presenting a long horizontal upper leg, a short horizontal lower leg spaced below the upper leg, and a generally upright, arcuate bight integrally interconnecting said legs adjacent a forward end thereof, said lower leg being attached to the shank assembly adjacent a free end of the lower leg, and said long leg having one of the wheels secured thereto adjacent a free end of the long leg.

7. A tillage tool as claimed in claim 6, further comprising an upright guide plate for each leaf spring secured to the shank assembly, said free end of the lower leg of each leaf spring being secured to a bottom edge of said guide plate, and said bight of the leaf spring being looped around the plate to dispose the upper leg of the leaf spring in overlying relationship to an upper edge of the guide plate, said upper edge of the guide plate serving as a stop to limit downward flexing of the upper leg.

8. A tillage tool as claimed in claim 7, said guide plate being secured to the shank assembly in a manner to permit selective up and down positional adjustment of the guide plate relative to the shank assembly for adjusting the vertical position of the corresponding wheel relative to the shank assembly.

9. A tillage tool as claimed in claim 7, each leaf spring having a pair of members depending from the upper leg thereof and trapping said guide plate therebetween for precluding twisting of the upper leg during flexing thereof.

10. A tillage tool as claimed in claim 9, said guide plate having a straight rear edge, said members having a transverse guide bar extending therebetween and movable along said rear edge of the guide plate during flexing of the upper leg of the leaf spring.

11. A tillage tool as claimed in claim 10, said guide plate having a shoulder on said rear edge disposed in the path of travel of the guide bar for limiting upward flexing of the upper leg of the leaf spring.

12. A tillage tool as claimed in claim 11,
said guide plate being secured to the shank assembly in a manner to permit selective up and down positional adjustment of the guide plate relative to the shank assembly for adjusting the vertical position of the corresponding wheel relative to the shank assembly.

13. A tillage tool as claimed in claim 6,
each of said springs being provided with a stop disposed in the path of flexing movement of the spring for limiting downward travel thereof.

* * * * *